Dec. 23, 1969    R. M. BLUM ETAL    3,484,926
FRICTION WELDING

Original Filed April 16, 1963    4 Sheets-Sheet 1

INVENTORS
ROBERT MORRIS BLUM
MILTON BERNARD HOLLANDER

Dec. 23, 1969  R. M. BLUM ETAL  3,484,926
FRICTION WELDING
Original Filed April 16, 1963
4 Sheets-Sheet 2
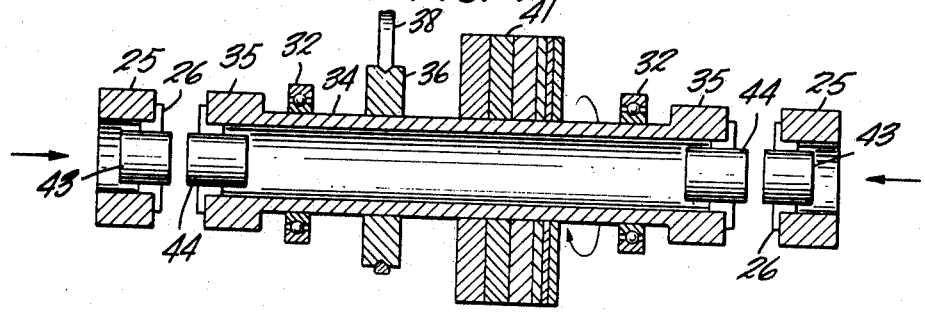
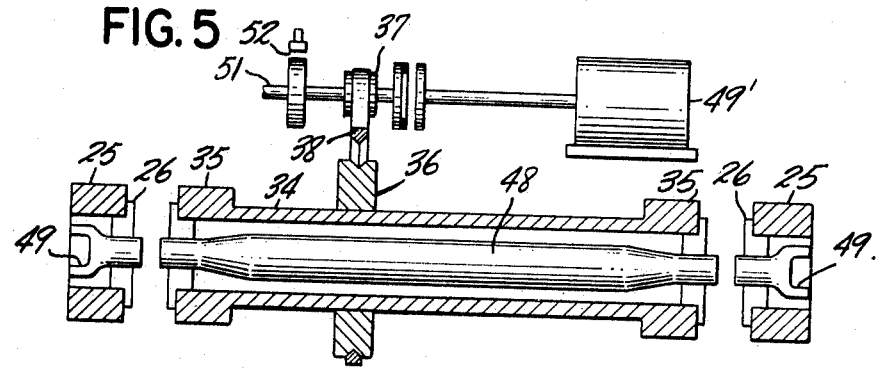
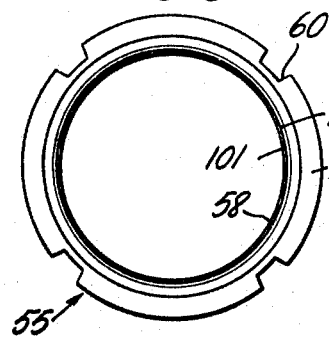
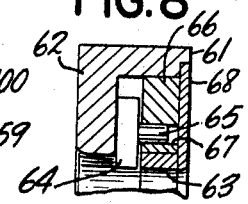
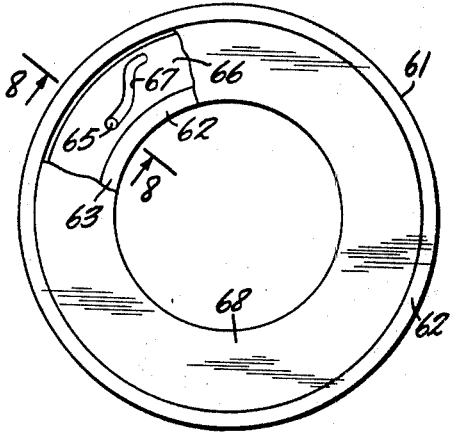
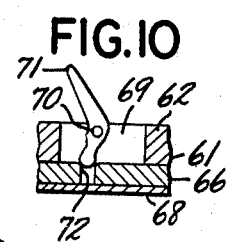
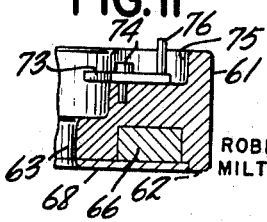
INVENTORS
ROBERT MORRIS BLUM
MILTON BERNARD HOLLANDER Dec. 23, 1969 R. M. BLUM ET AL 3,484,926
FRICTION WELDING
Original Filed April 16, 1963 4 Sheets-Sheet 3

INVENTORS
ROBERT MORRIS BLUM
MILTON BERNARD HOLLANDER

Dec. 23, 1969    R. M. BLUM ET AL    3,484,926
FRICTION WELDING
Original Filed April 16, 1963
4 Sheets-Sheet 4

INVENTORS
ROBERT MORRIS BLUM
MILTON BERNARD HOLLANDER

United States Patent Office 3,484,926
Patented Dec. 23, 1969

3,484,926
FRICTION WELDING
Robert Morris Blum, Westport, and Milton Bernard Hollander, Stamford, Conn., assignors, by mesne assignments, to Caterpillar Tractor Co., Peoria, Ill., a corporation of California
Original application Apr. 16, 1963, Ser. No. 273,487, now Patent No. 3,388,849. Divided and this application Feb. 19, 1968, Ser. No. 718,970
Int. Cl. B23k 27/00
U.S. Cl. 29—470.3     11 Claims

ABSTRACT OF THE DISCLOSURE

A center part is friction welded to two end parts by utilizing a rotating flywheel inertia mass to rotate the center part and then engaging the end parts with the center part under an axial load.

---

This is a division of application Ser. No. 273,487, filed Apr. 16, 1963, now Patent No. 3,388,849.

This invention relates in general to welding and, more particularly, to friction welding.

An object of this invention is to provide a less expensive, longer lasting, and more efficient friction welding apparatus which does not require special heavy duty thrust bearings.

Another object of this invention is to provide a versatile friction welding apparatus for production work.

Still another object of this invention is to provide for the friction welding of couplings between sections.

A further object of this invention is to provide a friction welding apparatus which makes two friction welds simultaneously. A single central piece may be welded on each end or two central pieces may be separately welded simultaneously to two outer pieces.

Yet another object of this invention is to accomplish a friction weld by rotating one or two intermediate workpieces, forcing two other workpieces against the rotating ends of the intermediate workpiece in order to generate sufficient heat to accomplish two friction welds at both ends simultaneously when rotation of the intermediate workpiece is stopped.

Many other objects, advantages, and features of invention reside in the particular construction, combination and arrangement of parts involved in the embodiments of this invention and from its practice as will be understood from the following description and accompanying drawing wherein:

FIGURE 4 is a longitudinal section through the spindle and the outer chucks of the first embodiment of this invention;

FIGURE 5 is a longitudinal section through the spindle and the outer chucks of a modification of the first embodiment of this invention with drive means for the spindle shown in position;

FIGURE 6 is an end view of a coupling which may be used to join lengths of pipe according to a second embodiment of this invention;

FIGURE 7 is a rear view of a drive chuck according to a second embodiment of this invention with a portion of the retaining ring broken away;

FIGURE 8 is a section taken on line 8—8 of FIGURE 7;

FIGURE 9 is a front end view of a fragment of the drive chuck shown in FIGURE 7;

FIGURE 10 is a section taken on line 10—10 of FIGURE 9;

FIGURE 11 is a section taken on line 11—11 of FIGURE 9;

Figure 1:
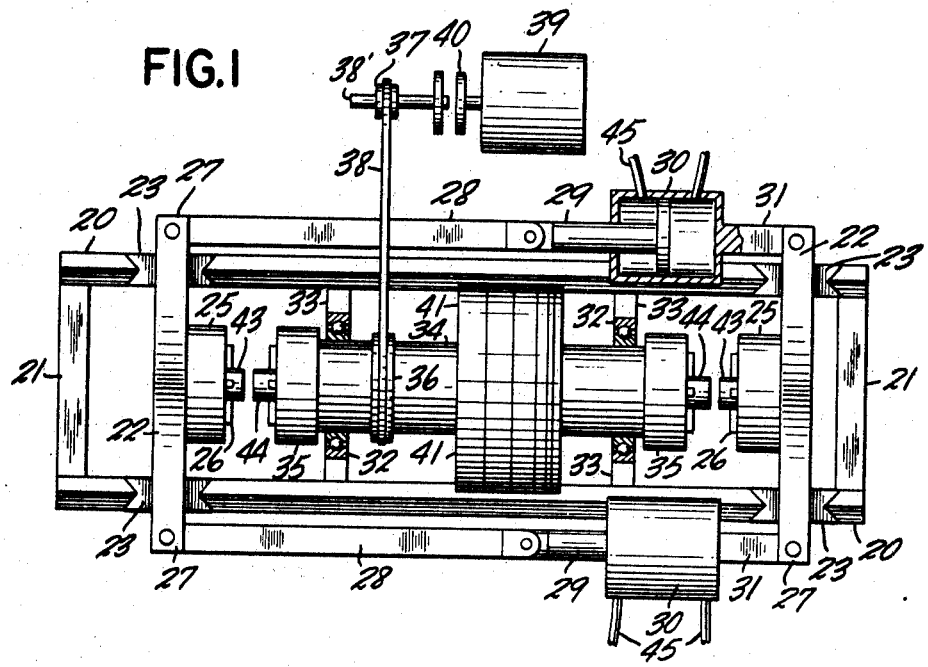
FIGURE 1 is a top view of a production friction welding apparatus according to a first embodiment of this invention with one hydraulic cylinder and two spindle support bearings shown in section.
Figure 2:
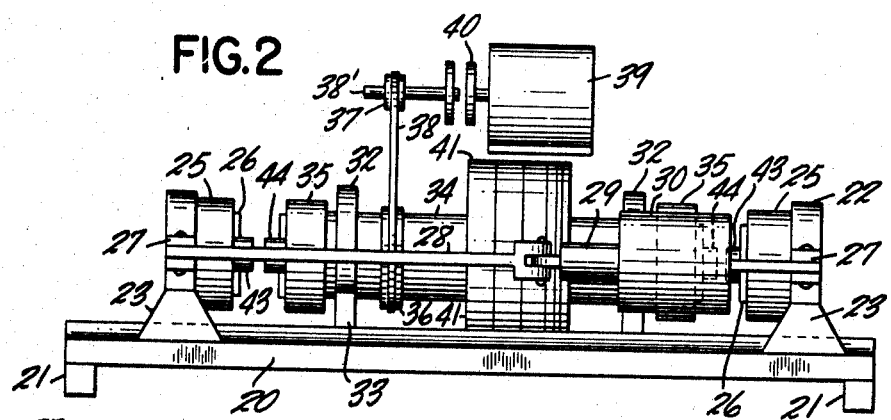
FIGURE 2 is a side view of the apparatus shown in FIGURE 1.
Figure 3:
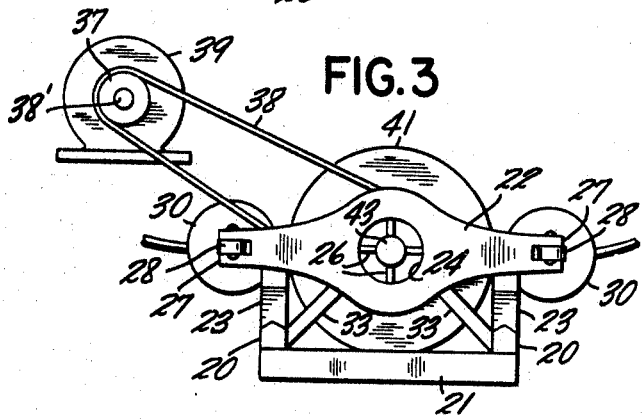
FIGURE 3 is an end view of the apparatus shown in FIGURE 1.

Referring to the drawing in detail, FIGURES 1, 2 and 3 show two machined ways 20 spaced apart by transverse bridging members 21. Slidably mounted for longitudinal motion above the machined ways 20 are the chuck support members 22 which have the slides 23 extend to contact the ways 20. Fixed to each chuck support member 22 in front of a large central aperture 24 in each chuck support member 22 is an outer chuck 25 having jaws 26.

Attached to the outer ends 27 of one chuck support member 22 are connecting links 28 which are pivotally attached to the piston rods 29 which extend from the hydraulic cylinders 30. The cylinders 30 are fixed by extensions 31 to the ends 27 of the other chuck support member 22.

Referring further to FIGURES 1, 2 and 3, two ball bearings 32 are positioned between the chucks 25 by bearing support members 33 which project upward from the ways 20. Rotatably mounted within the bearings 32 is the spindle 34 having the inner chucks 35 fixed to its ends. A pulley 36 is mounted on spindle 34 and it is driven by pulley 37 through link belt 38. Pulley 37 is mounted on a shaft 38′ which is driven by a motor 39 through the clutch 40. Also mounted on spindle 34 are a number of disk like weights 41.

The first embodiment of this invention is used in the following manner. Two pairs of workpieces 43 and 44 are secured in the chucks 25 and 35. Clutch 40 is engaged so that motor 39 may rapidly rotate spindle 34 and the disk like weights 41 fixed to it. When the spindle 34 is rotating at a desired speed, clutch 40 may be disengaged and hydraulic fluid under pressure may be introduced through the tubes 45 of the cylinders 30 to force the pistons 46 further into the cylinders 30 to withdraw the piston rods 29 and move the chucks 25 toward each other. As the surfaces of the relatively rotating pairs of workpieces 43 and 44 contact each other, frictional heat is developed in the areas of contact and spindle 34 rapidly slows down. If spindle 34 is rotated at a suitable speed, and if a suitable combination of weights 41 is mounted on it to give the workpieces 34, a sufficient amount of kinetic energy at the proper moment of inertia a friction weld will be made. Friction welds of metal workpieces over ¾ inch in diameter, can be accomplished in less than 40 revolutions for the pair. The kinetic energy of all rotating elements will be transformed into heat generated in the areas of contact between the workpieces, thereby welding them together.

As shown in FIGURE 5, spindlde 34 may accommodate a single workpiece 48 which has its ends secured by and in the chucks 35. If workpiece 48 is, for example, an automobile drive shaft, two workpieces 49, can be portions of universal joints which are fixed in the stationary chucks 25. Also, the outside workpieces of the universal can be positioned relative to each other so that they are welded in any prescribed angular relation to one another. Then, in the same manner which has been described, two friction welds may be simultaneously performed on both ends of a single workpiece.

Referring further to FIGURE 5, a more powerful motor 49' may drive spindle 34 through clutch 50 by pulleys 36 and 37 and the heavy duty link belt 38. Pulley 37 is mounted on shaft 51 which may have mounted on it a brake 52. A pair of friction welds may then be made with the apparatus as shown in FIGURE 5 by having the motor 49' rotate the spindle 34 and the workpiece 48 while the chucks 25 are moved together in the same manner which has been described to force the workpieces 49 against the ends of the workpiece 48. When sufficient heat has been developed in the areas of contact to accomplish the pair of friction welds, clutch 50 may be disengaged and brake 52 applied to stop the rotation of spindle 34 and workpiece 48 as chucks 25 force the workpieces 48 and 49 together to complete the friction welds.

The friction welding apparatus of the first embodiment of this invention is less expensive to manufacture than conventional friction welding apparatus and it will operate for a longer time without replacement of parts because heavy duty thrust bearings are not needed. The slides 23, or any other means of slidably mounting the stationary chucks 25, allow the chuck 25 to move laterally. Thus the chucks 25 force the workpieces within them with an equal force against the workpiece or workpieces held by the rotating chucks 35. Therefore, the bearings 32 need not be thrust bearings as they are only required to sustain the radial loads involved in supporting the spindle 34 and its associated elements. The thrust bearings of conventional friction welding machines are subject to large thrust forces.

The friction welding apparatus which has been described is very versatile as a production machine as it can be designed to handle the simultaneous welding of two sets of workpieces or the simultaneous welding of two workpieces on the ends of a single workpiece.

Figure 12:
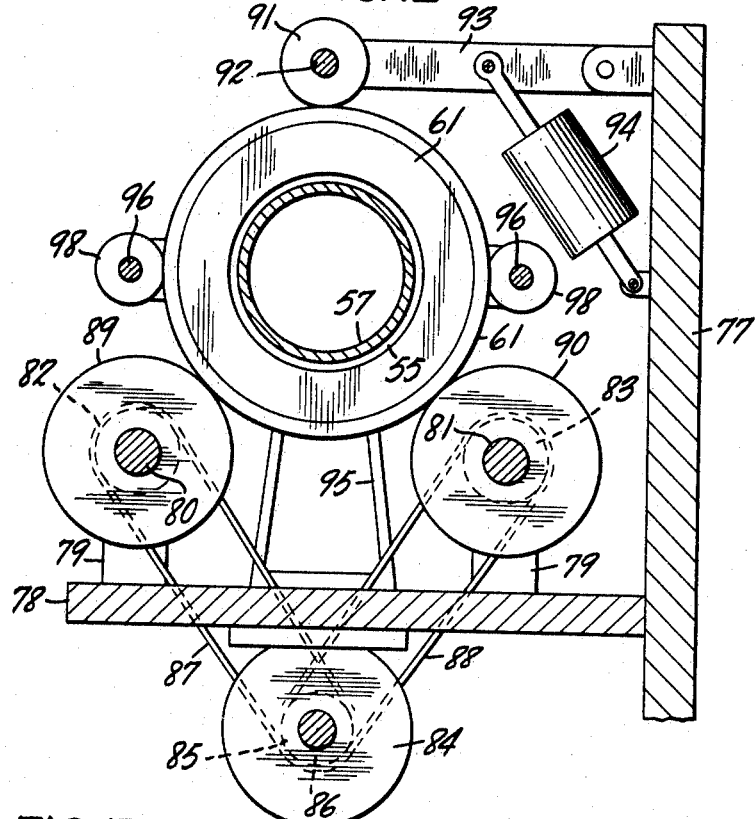
FIGURE 12 is a transverse vertical section through a length of pipe and a friction welding apparatus according to the second embodiment of this invention.
Figure 13:
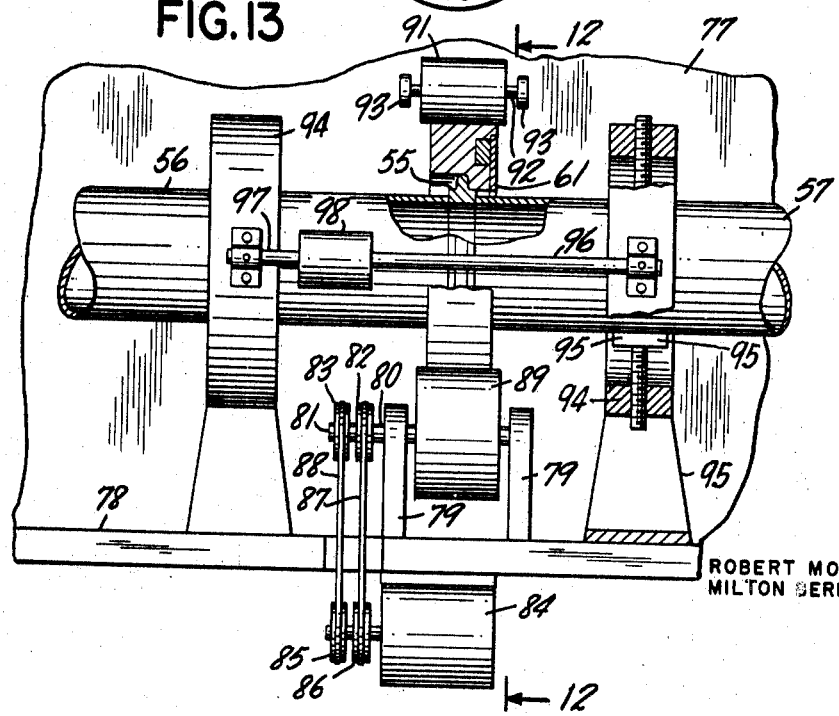
FIGURE 13 is a side view of the friction welding apparatus shown in FIGURE 12 with portions of the pipes being welded, the coupling, the drive chuck, and one of the longitudinally movable chucks broken away in section.
Figure 14:
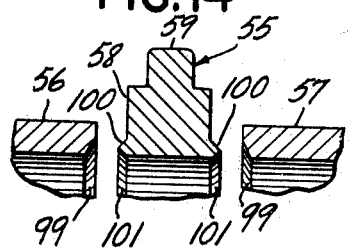
FIGURE 14 is a longitudinal section through fragments of a coupling and two lengths of pipe prior to their being friction welded.

Referring now to FIGURES 6–15, the second embodiment of this invention provides a special coupling 55 and an apparatus to friction weld this coupling 55 between two lengths of pipe 56 and 57 to join them as seen in FIGURE 13. Coupling 55, as shown in FIGURES 6 and 14, consists of an inner ring portion 58 which is thicker than the pipes to be joined and which has an annular flange 59 extending outward from it. The flange 59 has four notches 60 cut in it.

As shown in FIGURES 7–11, a special drive chuck 61 is made to support a coupling 55 within it. Drive chuck 61 has a main body portion 62 which has its central portion cut away leaving an inner annular flange 63 on the front side of the drive chuck. Set within the body 62 are four radially movable dogs 64 which have cam follower members 65 extend from them. A cam ring 66 is rotatably seated in a circular groove formed in the body portion 62 of the chuck. Four drive slots 67 are cut in the cam ring 66 to engage the followers 65. A retaining ring 68 is fixed to the body 62 of the chuck to hold the cam ring 66 in place.

Referring now to FIGURES 9 and 10, a slot 69 is formed in the body of the chuck 61. Pivotally mounted about shaft 70 is an operating lever 71 which engages a depression 72 in the cam ring 66. Thus the hammering or other manipulation of the end of the operating lever 71 will pivot it about shaft 70 to rotate the cam ring 66 relative to chuck body 62 to thrust the dogs 64 radially inward or withdraw them outward.

Referring now to FIGURES 9 and 11, axial retaining lugs 73 are rotatably mounted by bolts 74 within the four cut out portions 75 in the back or rear end of chuck body 62. Pins 76 may extend outward from the back of lugs 73 to assist in rotating them.

A coupling 55 is locked within chuck 61 by placing it in the chuck 61 and manipulating lever 71 to move the dogs 64 inward to engage the cut out notches 60 in the annular flange 59. Coupling 55 is further locked against axial motion by rotating the lugs 73 so that the annular flange 59 is locked between the lugs 73 and the inner annular flange 63 of the body of the chuck.

Referring now to FIGURES 12 and 13, a vertical side plate 77 has a horizontal base 78 project from it. Pairs of upright members 79 have the shafts 80 and 81 journaled in them. The shafts 80 and 81 have the pulleys 82 and 83 mounted on them. An electric motor 84 has pulleys 85 and 86 mounted on it to drive the pulleys 82 and 83 by belts 87 and 88. Mounted on the shafts 80 and 81 are the chuck support and drive rollers 89 and 90 which may be coated with a resilient material or a good tractive surface.

It is obvious that the apparatus of FIGURE 5 may be driven by the roller method driving the coupling in FIGURES 12, 13, 16 or 17. Workpieces may easily be changed.

As is further shown in FIGURES 12 and 13, a pressure roller 91 is rotatably supported on a shaft 92 which extends between the arms 93 which are pivotally attached to the vertical side plate 77. A hydraulic cylinder 94 may be activated to pull the arms 93 downward to hold the roller 91 against the top of a drive chuck 61.

Two stationary pipe engaging chucks 94, having jaws 95 which may be tightened to grip the pipes 56 and 57, are slidably mounted on base 78 by pedestals 95. Other methods of slidably mounting chucks 94 for axial movement, such as mounting them on longitudinal slide rails or guides, would be suitable. Extending between the chucks 94 are sets of connecting rods 96 and 97 which are connected to hydraulic cylinders 98. The cylinders 98 may be activated to draw the axially slidable stationary chucks together.

The second embodiment of this invention is used in the following manner. Side plate 77 and base 78, or any other equivalent and suitable structure, may be carried on a mobile pipe laying vehicle. Pipe 56 would already have been joined to the end of the pipe line being assembled and laid. A coupling 55 is inserted in chuck 61 and locked in place. Pipe 56 is secured within the chuck 94 shown on the left in FIGURE 13. A new length of pipe 57 is secured in the other chuck 94. Chuck 61 is held against the rollers 89 and 90 by the pressure roller 91 as hydraulic cylinder 94 is activated to urge roller 91 downward. Motor 84 is started to rotate chuck 61 and the coupling 55 locked within it. The hydraulic cylinders 98 is then activated to draw the ends of pipes 56 and 57 against each side of coupling 55 thereby generating sufficient heat to accomplish a friction weld.

If chuck 61 and coupling 55 are rotated at a sufficient speed and if they have a high enough moment of inertia, no braking mechanism is required to complete a friction weld. If a lighter chuck and coupling are to be used, chuck 61 is driven by motor 84 at a desired rate of speed until sufficient heat is generated in the weld areas at which time a brake (not shown) can be applied to stop the rotation of coupling 55. If required, the outer surface of chuck 61 can have gear teeth formed on it and the rollers 89 and 90 can have matching gear teeth formed on them so that the chuck 61 is positively driven by motor 84.

After coupling 55 has been welded between the lengths of pipe 56 and 57, the jaws 95 of the chucks 94 are disengaged, the operating lever 71 of chuck 61 is manipulated to withdraw the dogs 64, and the lugs 73 are rotated clear of flange 59. The entire apparatus, including chuck 61, may then be moved to the right, as shown in FIGURE 13, and the apparatus may again be positioned to weld the next section of pipe.

Figure 15:
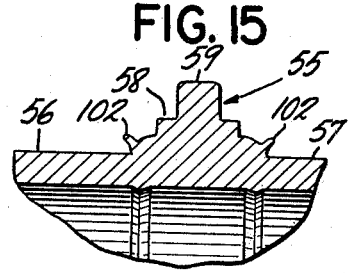
FIGURE 15 is a longitudinal section through fragments of a coupling and two pieces of pipe after they have been friction welded.
Figure 16:
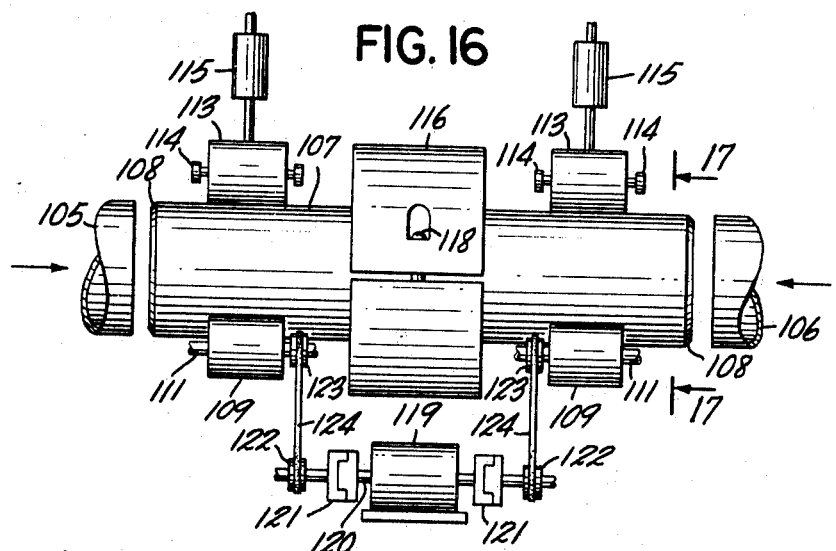
FIGURE 16 is a side view of elements of a portion of a friction welding apparatus according to a third embodiment of this invention with fragments of pieces of pipe to be welded shown in position.
Figure 17:
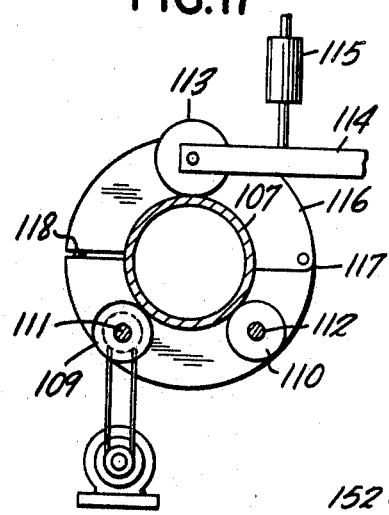
FIGURE 17 is a transverse vertical section taken on line 17—17 of FIGURE 16.

As may be seen in FIGURES 6, 14 and 15, tapered surfaces 99 can be provided at the ends of the pipes 56 and 57 to engage the outer tapered surfaces 100 of the coupling 55. Formed on the inner side of surface 100 is the surface 101 which slopes away from the corresponding portion of surface 99. The surfaces 100 and 99 tend to align the coupling 55 with the pipes to be joined. Upset formed during the friction welding merely tends to fill the space left between the surfaces 101 and 99 so that a relatively smooth and upset free surface is left within the joined pipes as shown in FIGURE 15. Upset 102 formed outside the joined pipes does not interfere with flow through them. Many other suitable configurations of the mating surfaces to be friction welded may be used.

FIGURES 16 through 19 show how two pieces of pipe 105 and 106 may be friction welded according to a third embodiment of this invention. A short length of pipe 107 having chamfered ends 108 serves as a coupling to be friction welded between the pipes 105 and 106. Each end of pipe 107 is supported by a pair of support rollers 109 and 110 which are fixed to rotatably mounted shafts 111 and 112. Two pressure rollers 113 are rotatably mounted between the ends of the arms 114 which are pivotally mounted to be forced downward by the hydraulic cylinders 115.

A relatively massive weight 116 is formed with a hinge portion 117 and a bolt 118 as a fastening means to clamp the weight about pipe 107 between the sets of rollers 109 and 110.

Pipe 107 is friction welded between pipes 105 and 106 in the following manner. Motor 119 drives shaft 120 on which are mounted the clutches 121 so that motor 119 may drive the pulleys 122 and thereby the pulleys 123 by belts 124 through the clutches 121. Thus motor 119 drives the support rollers 109 to rotate pipe 107. A mechanism, which may be similar to that shown in the second embodiment of this invention, forces the pipes 105 and 106 toward each other against the ends of pipe 107. The clutches 121 are then disengaged and the kinetic energy stored in pipe 107 and weights 116 are consumed in the friction welding process in the manner which has been described.

Figure 18:
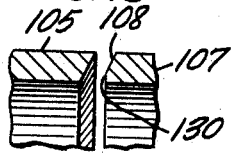
FIGURE 18 is a longitudinal section through fragments of a pipe and a piece of intermediate pipe prior to their being friction welded.
Figure 19:
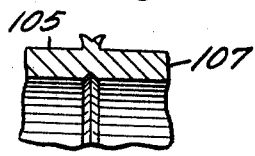
FIGURE 19 is a longitudinal section through fragments of a piece of pipe and a piece of intermediate pipe after they have been friction welded.
Figure 20:
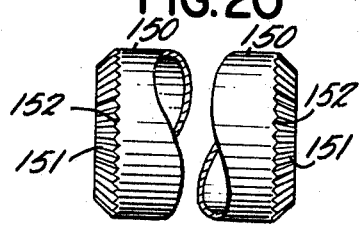
FIGURE 20 is a side view of a cutting tool with its center portion broken away.

As shown in FIGURE 18, an inner portion 130 of the chamfered ends of pipe 107 is beveled away from the mating portions of pipes 105 and 106 so that, as shown in FIGURE 19, little or no upset is formed inside the joined pipes.

If it is desired, a special section of pipe 150 may be formed of the same length as the pipes 107 and have its outer ends 151 fabricated with serrations 152 to act as cutting edges. Then unprepared pipes 105 and 106 may be chucked in a suitable apparatus and forced toward each other against a rotating pipe 150 to prepare the ends of pipes 105 and 106 for friction welding to a pipe 107. The special section of pipe 150 may then be removed and a section of pipe 107 mounted on the rollers 109 and 110 in place of it for friction welding.

What is claimed is:
1. A method of friction welding a center part to two end parts comprising storing all of the energy needed to produce the welds in a rotating flywheel inertia mass associated with the center part before the center part and the end parts are engaged; engaging the end parts with the center part under an axial load; and, driving the center part from the flywheel to produce rubbing contact and the weld heat required to produce the friction welds.

2. A method as set forth in claim 1 wherein two center parts are driven from the flywheel and welded to the two end parts.

3. A method as set forth in claim 1 wherein the center part is held in a hollow spindle.

4. A method as set forth in claim 2 wherein the two center parts are held in a hollow spindle.

5. A method as set forth in claim 3 wherein the flywheel mass is mounted on the spindle.

6. A method as set forth in claim 4 wherein the flywheel mass is mounted on the spindle.

7. A method of friction welding a center part to two end parts comprising placing the center part in a rotatable workpiece holding spindle; placing the end parts in non-rotatable workpiece holding means located on each side of the spindle; operatively associating a weight means with the spindle for storing all of the energy needed to produce two friction welds between the center part and the two end parts; engaging a drive means to rotate the spindle and associated weight means to a predetermined speed necessary to store the energy needed to produce the two friction welds; disengaging the drive means; engaging the end parts and the center part under a predetermined axially applied pressure until the center part is bonded to the two end parts and the stored energy of the weight means is expanded.

8. A method as set forth in claim 7 wherein two center parts are held in the rotatable workpiece holding spindle for friction welding to the two end parts.

9. A method as set forth in claim 7 wherein the rotatable workpiece holding spindle is hollow.

10. A method as set forth in claim 8 wherein the rotatable workpiece holding spindle is hollow.

11. A method as set forth in claim 7 wherein the weight means is mounted on the spindle.

References Cited

UNITED STATES PATENTS 3,134,278    5/1964    Hollander et al. __ 29—470.3 X

OTHER REFERENCES

Friction Welding of Metals by Vill, pp. 1–8.

JOHN F. CAMPBELL, Primary Examiner

U.S. Cl. X.R.

29—471.1